(12) United States Patent
Marcus

(10) Patent No.: US 7,644,362 B2
(45) Date of Patent: Jan. 5, 2010

(54) ALTERNATIVE USER-INTERFACE

(75) Inventor: R. Cameron Marcus, Arlington, TX (US)

(73) Assignee: Central Coast Patent Agency, Inc., Watsonville, CA (US)

(*) Notice: Subject to any disclaimer, the term of this patent is extended or adjusted under 35 U.S.C. 154(b) by 769 days.

(21) Appl. No.: 10/771,070

(22) Filed: Feb. 2, 2004

(65) Prior Publication Data

US 2005/0172075 A1 Aug. 4, 2005

(51) Int. Cl.
*G06F 3/00* (2006.01)
*G01M 1/38* (2006.01)

(52) U.S. Cl. .......................... 715/700; 715/740; 710/8; 700/275

(58) Field of Classification Search ................. 715/734, 715/764, 700, 740; 710/13, 8, 313; 700/90, 700/275, 276
See application file for complete search history.

(56) References Cited

U.S. PATENT DOCUMENTS

| | | | | |
|---|---|---|---|---|
| 5,634,346 A | * | 6/1997 | Ramakrishnan et al. | 62/89 |
| 6,615,088 B1 | * | 9/2003 | Myer et al. | 700/20 |
| 7,086,583 B2 | * | 8/2006 | Wurzburg | 235/375 |
| 2002/0035404 A1 | * | 3/2002 | Ficco et al. | 700/65 |
| 2002/0091452 A1 | * | 7/2002 | Addink et al. | 700/19 |
| 2003/0002081 A1 | * | 1/2003 | Leone et al. | 358/1.18 |
| 2003/0011868 A1 | * | 1/2003 | Zehner et al. | 359/296 |
| 2003/0041206 A1 | * | 2/2003 | Dickie | 710/303 |
| 2003/0167376 A1 | * | 9/2003 | Koh | 711/115 |
| 2003/0195904 A1 | * | 10/2003 | Chestnut et al. | 707/204 |
| 2005/0096753 A1 | * | 5/2005 | Arling et al. | 700/11 |
| 2005/0198233 A1 | * | 9/2005 | Manchester et al. | 709/221 |

* cited by examiner

*Primary Examiner*—Ting Lee
(74) *Attorney, Agent, or Firm*—Donald R. Boys; Central Coast Patent Agency, Inc

(57) ABSTRACT

A system for programming a programmable device having an interface for a portable memory medium has an interactive interface executable on a stand-alone computer appliance for creating a program for the programmable device, a portable memory medium, and a downloading mechanism for transferring the created program to the portable memory medium.

4 Claims, 4 Drawing Sheets

ALTERNATIVE USER-INTERFACE

FIELD OF THE INVENTION

The present invention is in the area of electronic devices and pertains more particularly to methods and apparatus for programming electronic devices.

BACKGROUND OF THE INVENTION

Modern electronic devices such as thermostats, cellular telephones, and lawn sprinklers, among many other such devices are typically programmed through an interface of programming inputs, including variously pushbuttons, dials, and one or more displays located on the electronic device itself. This interface of programming inputs on the electronic device and the necessary apparatus between the inputs and an on-board memory storing an operating program is quite expensive. By some estimates the interface can approximate up to ⅔ of the manufacturing costs. Besides being quite expensive these interface systems are confusing and ineffective, and difficult for a user to operate properly.

Part of the problem is lack of space. A design engineer cannot design a device to accommodate a sufficiently intuitive interface because the device would become too large and cumbersome. Instead, design engineers attempt to make their electronic devices as small and elegant and therefore as inexpensive as possible. Consequently, design engineers have a small area on the device to work with: they must make their programmable devices operational with as minimal an interface as possible. This means that many of the inputs are consequently multi functional. Hence, many inputs must represent two or more completely different functions or commands. Therefore, when a device must be programmed with an interface of multi functional inputs, users can become frustrated by endlessly attempting to make basic programming commands.

What is clearly needed is a method of divorcing the interface systems from the electronic device itself and replacing the interface system with a more comprehensive and user-friendly alternative. By utilizing an alternative method, separate from the programmable device, a manufacturer can conceivably make devices much more powerful by offering consumers a more variegated array of commands and options. Such advantages can make them more competitive in the marketplace as well. And more commands and more options means more power and more satisfaction for both the manufacturer and the consumer.

SUMMARY OF THE INVENTION

In an embodiment of the present invention a system for programming a programmable device having an interface for a portable memory medium is provided, comprising an interactive interface executable on a stand-alone computer appliance for creating a program for the programmable device, a portable memory medium, and a downloading mechanism for transferring the created program to the portable memory medium.

In one embodiment the portable memory medium is a magnetic strip card, and the downloading mechanism is a magnetic strip writer connected to the computer appliance. In another embodiment the portable memory medium is a thumb drive having a USB male connector. In many embodiments the computer appliance is a personal computer (PC). The PC may be connected to the Internet network, and the interactive interface may be provided by a Web site in the Internet network.

In some embodiments the interactive interface is read by the PC from a portable memory medium provided with the programmable device. In some embodiments the portable memory medium is a compact disk read-only medium (CD-ROM).

In some embodiments the system may comprise a programmable device having an interface for the portable memory medium. In some cases the portable memory medium may be a magnetic strip card, and the interface may be a magnetic strip card writer. In other embodiments the portable memory medium may be a thumb drive and the interface may be a female USB port for receiving the male USB connector of the thumb drive.

In another aspect of the invention a programmable device is provided, wherein the entire programming interface comprises a port for receiving a portable memory device, and logic for reading a program from a portable memory device engaged at the port and for transferring that program to an internal memory for execution.

In some embodiments the device is one of a lawn sprinkler controller, a VCR, a thermostat, or a cellular telephone. In some embodiments the port for receiving is a female USB port for receiving a male USB connector of a thumb drive. Also in some embodiments the port for receiving is a magnetic strip reader for reading a program from a magnetic strip card.

In yet another aspect of the invention a method for programming a programmable device is provided, comprising acts of (a) providing a sole programming interface for the device as a port for reading a portable memory medium and logic for transferring a program from the medium to an internal memory of the device; (b) providing an interactive interface for creating a program for the programmable device, the interactive interface executable on a display of a computer appliance having a downloading mechanism for recording a program created on the portable memory medium; and (c) using the portable medium for transferring the program created to the programmable device.

In still another aspect of the invention a system for programming a programmable device having an interface for receiving a program is provided, comprising an interactive interface executable on a stand-alone computer appliance for creating a program for the programmable device, and a transmitter for transmitting the program to the programmable device.

In one embodiment the transmitter is an infra-red transmitter and the interface at the programmable device is an infra-red reader. In yet another embodiment the transmitter is a magnetic loop transmitter and the interface at the programmable device is a magnetic loop receiver. In still another embodiment the transmitter is a radio frequency (RF) transmitter and the interface at the programmable device is an RF receiver.

In various embodiments of the present invention taught in enabling detail below, for the first time a system is provided wherein programmable devices may be designed and built without a complicated user interface for adding a functional program, and more useful programs may be created than have been possible in the state of the art at the time of filing the present application.

BRIEF DESCRIPTION OF THE DRAWING FIGURES

DESCRIPTION OF PREFERRED EMBODIMENTS

According to a preferred embodiment of the present invention, a unique apparatus and method including software and a data transfer system is used to enable end-users to program VCR's, DVD's, sprinkler systems, security systems, thermostats, and other programmable devices using a user-friendly interface system through means of a personal computer. The method and apparatus of the present invention is described in enabling detail below.

Figure 1:
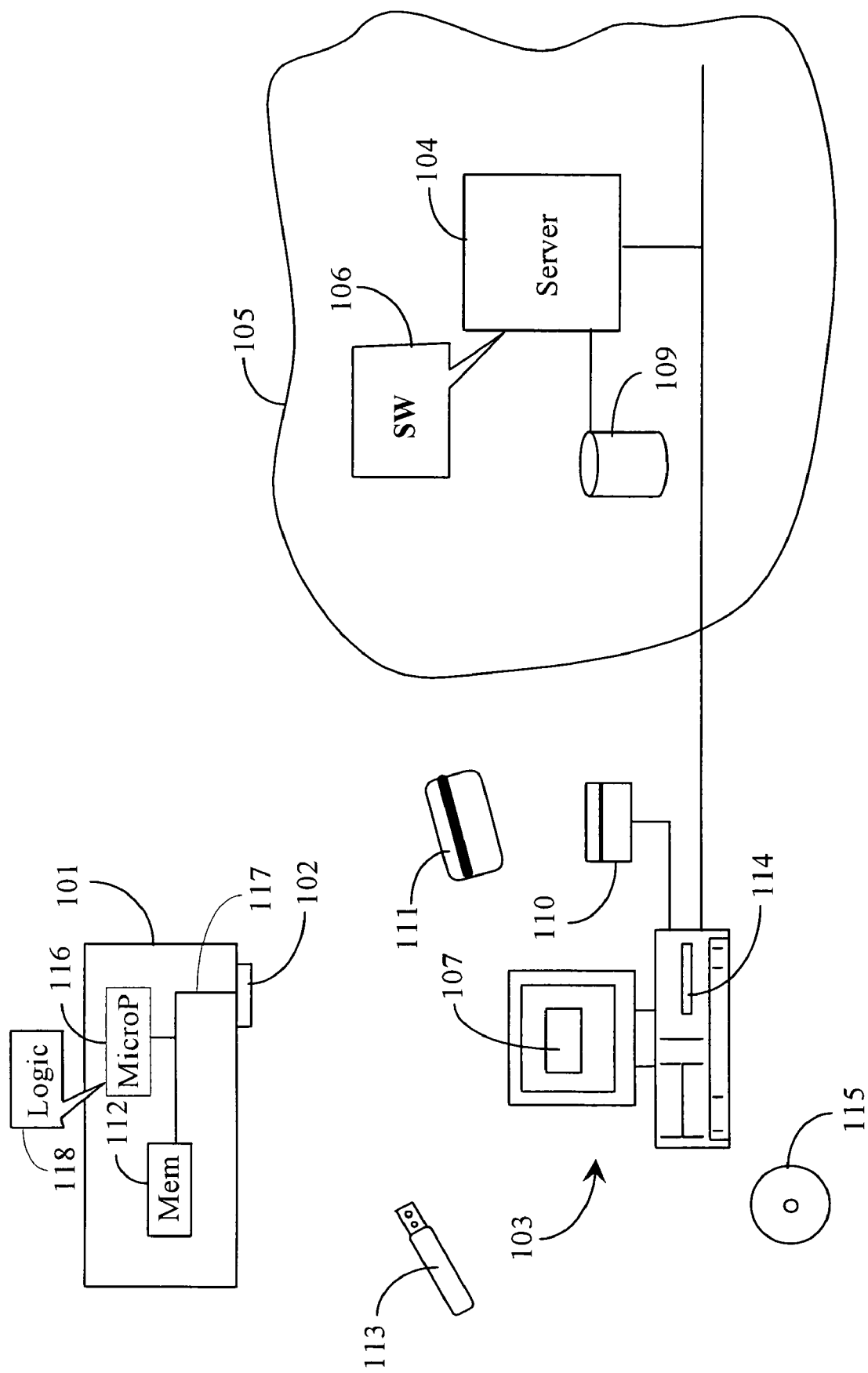
FIG. 1 is a block diagram of an apparatus according to an embodiment of the present invention.

FIG. 1 is an illustration of a system according to a preferred embodiment of the present invention. In this example, device 101 is the electronic device to be programmed, which may be any electronic device that requires user programming to be useful, such as a lawn sprinkler controller, a VCR player, a cellular telephone, and the like. Device 101 has a port 102 for accepting data and commands constituting a program to guide the device in performing its functions, which program, once transmitted to and accepted by the device, is caused to reside in a digital on-board memory 112 of the device. The term program is used somewhat broadly in this regard, and should be taken to mean any digital information that needs to be entered to the programmable device to aid the device in performing its intended functions.

Programmable devices, such as sprinkler controllers and the like, as mentioned above, typically have an onboard memory such as memory 112, and at least a microprocessor 116 to execute logic, such as programs to cause the device to execute its functions once programs. Port 102, memory 112 and microprocessor 116 in this embodiment all communicate on an internal bus 117, which may be, for example, a parallel bus. In this embodiment device 101 is also enabled with logic 118, executable on processor 116, for handling incoming programming data.

The overall system in an embodiment also includes a computer 103 used for initial preparation of the program for the programmable device. In this particular embodiment computer 103 accesses an Internet server (Web site) 104 in the Internet network 105 for a programming system to aid in creating a program for device 101. Server 104 is connected to a data repository 109 which may be a separate database accessible by the Website or a part of the website. Data repository 109 stores programs and data useful for a user of computer 103 to program device 101. It is not specifically required that a computer 103 be used to access the Internet. In alternative embodiments, a television set or other computerized appliance may be equally expedient for accessing the Internet and performing the programming function for device 101.

In the embodiment illustrated by FIG. 1 server 104 executes software 106 providing an interactive interface 107 on a video display of computer 103, whereby the user may input information and make selections to create a program for device 101. In a preferred embodiment device 101 is provided by a manufacturer and sold perhaps through a third-party reseller. Instructions accompany the device for a user to access server 104, operated by or on behalf of the manufacturer of device 101 and the reseller of the device. Further examples of user interfaces and programming of a separate device 101 through computer 103 (or similar appliance) are provided below in this specification.

After complete instructions have been entered through user interface 107, creating data and commands for a program useful by device 101, it is needed to transfer the program to device 101. There are a relatively wide choice of ways in different embodiments of the invention to accomplish the data transfer. For example, in one embodiment, once a program is created on computer 103 for device 101 the program may be downloaded through an optional magnetic strip writer 10, which may connect to computer 103 by a USB port, a standard serial port, or in some other way. In this particular embodiment port 102 is a magnetic strip reader, and to transfer a prepared program from computer 103 to device 101, the user swipes magnetic strip card 111 through writer 110, and then through reader 102. Reader 102 with the aid of logic 118 executing on processor 116 of device 101 stores the program in on-board memory 112 in device 101. Logic 118 enables port 102 to recognize incoming data, and processes and stores the program in an appropriate manner, so the program is enabled to serve in subsequent operation of device 101.

In an alternative embodiment the mechanism for program transfer is a thumb drive 113 which is plugged into a USB port of computer 103, allowing the user to transfer the prepared program to thumb drive 113. In this case port 102 is a USB port, and the user simply plugs thumb drive 113 into USB port 102, which engagement is recognized by logic 118, which causes the prepared program to load appropriately into memory 112.

In other embodiments other data transfer mechanisms may be used. For example, element 110 may be an infra-red transmitter connected to computer 103 rather than a magnetic strip writer, in which case port 102 will be an infra-red receiver port, and there may be a code sequence to signal to logic 118 that following code in infrared transmission is a program to be loaded. In another embodiment RF transmission may be used, in which case element 110 is an RF transmitter, and logic 118 will recognize appropriate code to load a program being transmitted. In yet another embodiment a magnetic loop driver may be provided in place of writer 110, which is a relatively simple device which transmits data as variations in a magnetic field, in which case port 102 will be a magnetic loop reader. This magnetic loop technology is essentially the same as is used for wireless pointer devices and keyboards, for example.

With respect to the thumbdrive embodiment, where the thumb drive is represented by element 113 of FIG. 1, it is known to the inventor that the amount of memory necessary to program an electronic device is relatively small. It will not be necessary for a thumbdrive 201 to have in most cases more than 50 Kilobytes of memory. Thumbdrives as known in the art typically, however, have 256 megabytes or more of memory. However, the amount of memory of a thumbdrive 201 is not a specific limitation in the invention. The amount of memory necessary for the thumbdrive 201 will largely be dictated by economic factors rather than meeting a minimum memory threshold.

In another embodiment of the present invention, computer 103 has a CD-ROM drive 114, and a compact disk (CD) 115 is provided with the programmable device upon purchase. In this case CD 115 provides the interactive user interface 107 and all necessary software for a user to interact and do the necessary programming on the PC. In this embodiment, instead of using computer 103 to access a program on a website 104 on the Internet, a CD-ROM drive 114 and accompanying CD 115 are used in lieu of the website 104. CD 115 contains the program interface 105 through which the user may program the device. The operational details of how to develop a program interface 105 by which to program the electronic device is within the ordinary skill of an artisan in the art. Again, there is no general limitation that computer 103 be used to access only the Internet or a CD 402. The computer 103 may be used to access another alternative medium, as well.

In addition, CD 115 may come with installation instructions. Once the user accesses interface 107, the program may tell user how to mount or install the electronic device, what size batteries are required for the electronic device, warranties, and other boilerplate provisions. The instructions may also give a telephone number to contact a customer support hotline for the product. In addition, interface 107 may also refer user to a website. For instance, "For more details on how to program sprinkler system please visit our website at www.grass-genie.com".

Figure 2:
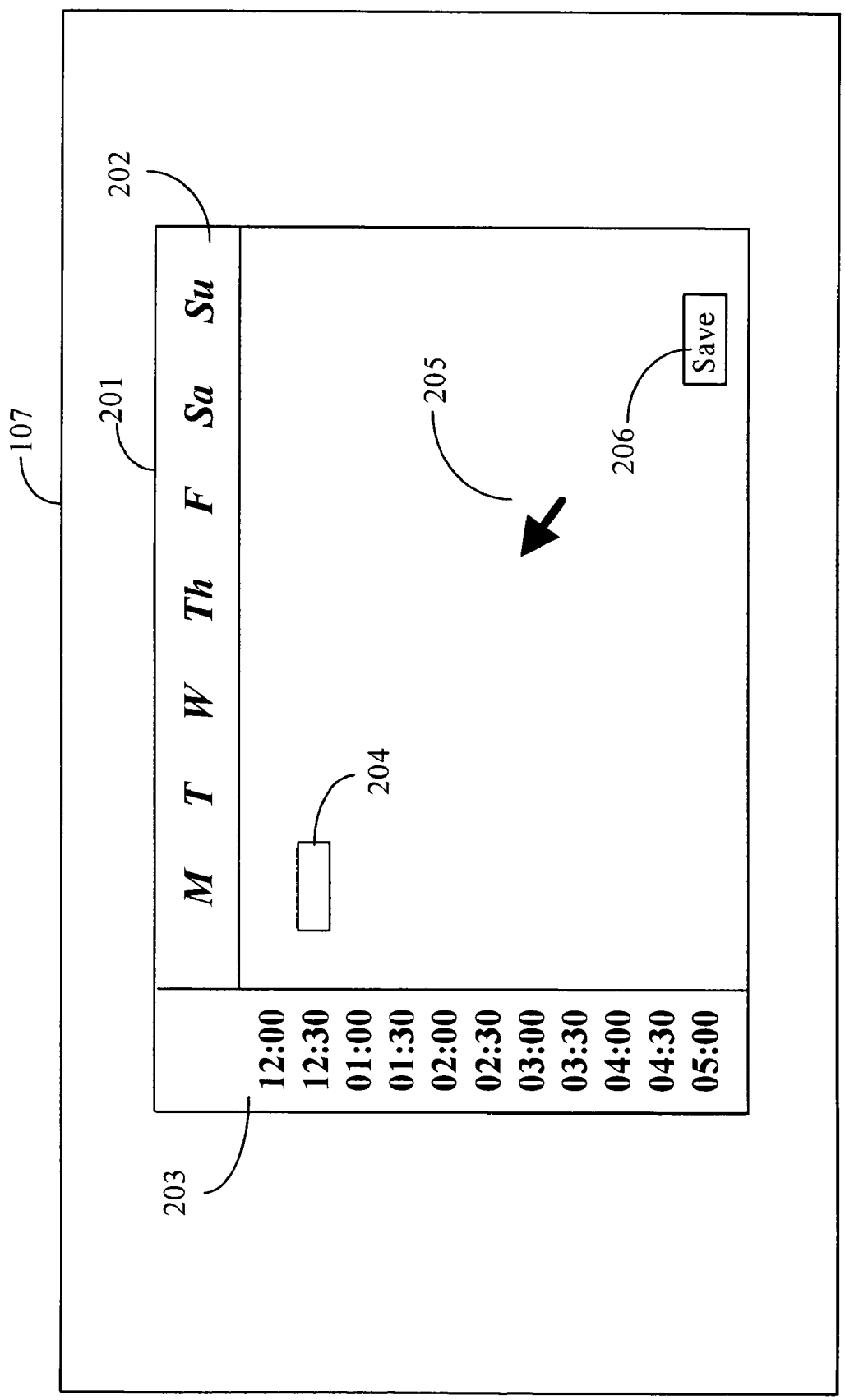
FIG. 2 illustrates an interactive interface useful in programming according to an embodiment of the present invention.

FIG. 2 illustrates at least in part an exemplary user interface 107 for use in programming a control device 101 in the case that the control device is a lawn sprinkler. In this example interface 107 displays a diagram 201 allowing a user to set time and day for watering. Row 202 of the diagram lists the days of the week, and colum 203 indicates time-of-day in thirty minute increments. Times are indicated from midnight to 5:00 AM, but typically the entire twenty-four hours may be indicated. Therefore each intersection block 204 represents a 30 minute increment on a particular day.

In this example a user may activate a block 204 by moving cursor 205 to the block and selecting with the left mouse button (or other pointer input). When a block 204 is activated, it shows in a first color, such as green. When not activated, no block is shown. This embodiment assumes that watering is to take place for a minimum of at least thirty minutes. If other time periods are preferred, there are a number of ways such granularity may be accommodated, such as by a different diagram for, say, fifteen minute intervals or one hour intervals, or there might be functionality for entering a portion of an interval when a block is selected, for example.

After the user is satisfied with the watering program, the selections may be saved by selecting Save button 206. Once a program is saved it may be transferred to a portable memory device for transfer to a programmable device, or transmitted by one or another of the methods described above.

Figure 3:
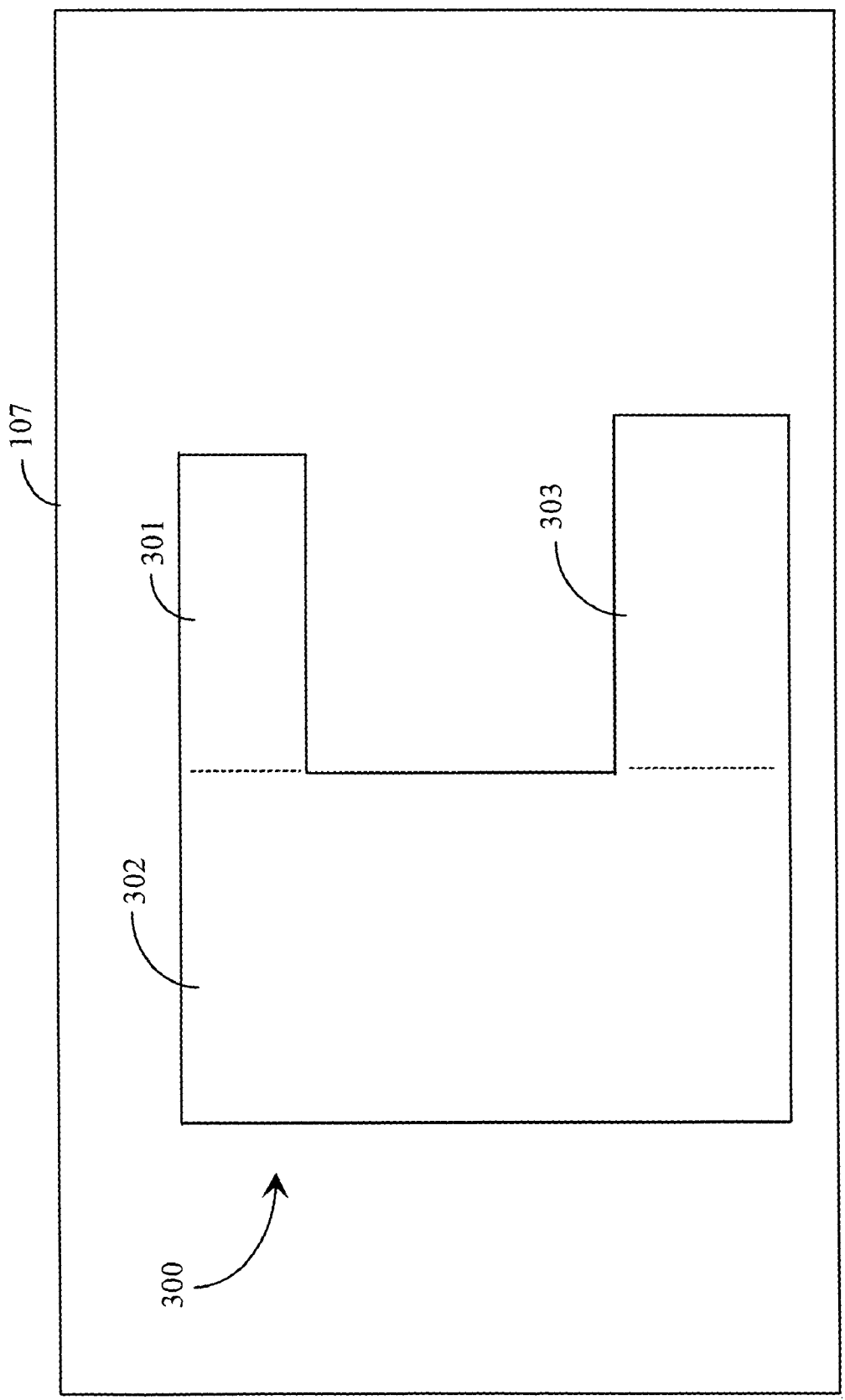
FIG. 3 illustrates another interactive interface useful in programming according to an embodiment of the present invention.

FIG. 3 illustrates another exemplary diagram that may be displayed on interface 107 showing zones for a lawn 300 to be watered. The "C" shape of lawn 300 in this example is selected from a menu of shapes from which the user may select. In addition to a variety of shapes from which a user may select to approximate his/her own lawn, there may also be a process for a user to draw the shape of the lawn. In this particular layout lawn 300 comprises 3 zones: A, B, and C (301, 302, and 303 respectively). The user may, for example, program watering for zone 301 to activate from 5-7:am using program interface 107. Likewise, he may program both zones 302 and 303 to activate from 6-8:pm. In this manner considerable granularity may be provided for a user to program a sprinkler system.

The skilled artisan will recognize that the interactive interface and tools provided for a user to program a lawn sprinkler, or any other programmable device, may vary widely from the example shown. There are many possibilities.

Figure 4:
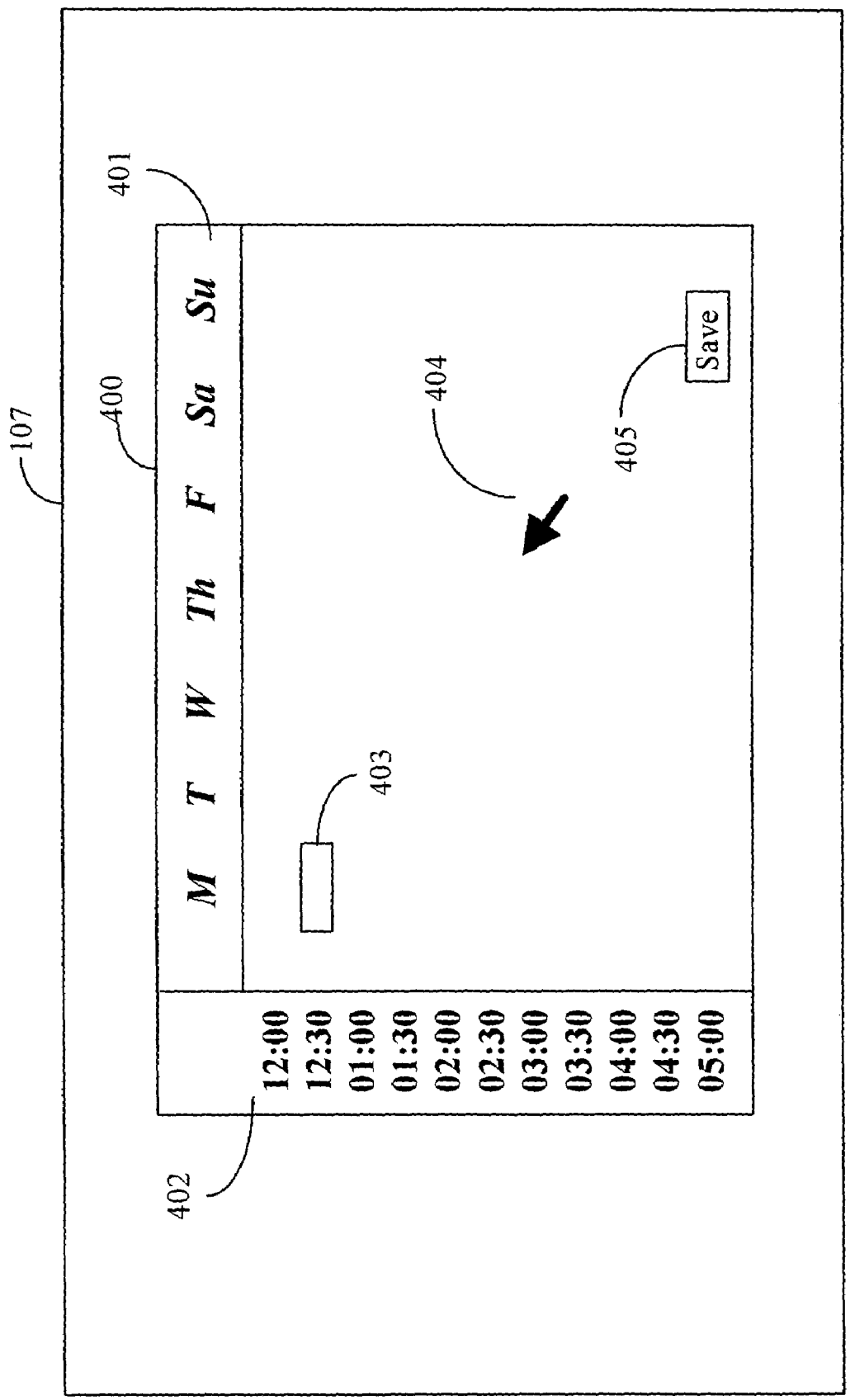
FIG. 4 illustrates yet another interactive interface useful in another embodiment of the present invention.

FIG. 4 is another example of a website interface 107, showing an interactive diagram 400 in this case for programming a thermostat. Row 401 in this example lists the days of the week, while column 402 lists the time-of-day in 15 minute increments. Blocks 403 may be selected to provide programming for that day and time for either heating or air conditioning.

In addition to the above, when the user selects a block, a default temperature is displayed, which may be, for example, 65 degrees Fahrenheit. The user is enabled to edit the temperature number in the block in the came manner that one edits text in a word processing program, using the keyboard. Alternatively, a drop-down menu may be displayed from which the user may select different temperatures.

It will be apparent to the skilled artisan that there are a number if different ways that temperatures may be set, and further granularity may be provided in time and temperature increments.

It is not specifically required that the user-friendly interface in different embodiments of the invention be provided through a personal computer. Other sorts of computer appliances may be used, such as a personal digital assistant. In another embodiment of the invention a user may use a telephone operator or other service person as the interface itself. A user may simply tell the service person the instructions, and then the service person will transfer information to such as thumbdrive 201 or magnetic strip card 202. The service person then mails are otherwise delivers the portable memory to the user, and the user will then use this thumbdrive 201 or magnetic strip card 202 to program his electronic device.

An object of the present invention is to provide for programming a programmable device using a computer or other relatively robust appliance, and then to provide for easily an relatively simply transferring the program to the device, which may be remote from the device. A lawn sprinkler controller, for example, will not normally be installed in a user's study next to the user's computer. For this reason, in preferred embodiments, a transfer mechanism, typically a portable memory medium such as a thumb drive or a magnetic strip card is used, so the program can be relatively easily transferred from the computer to the programmable device. Further, in preferred embodiment, the transfer memory device may be a repository for the program, so the program may be rather easily re-entered to the programmable device if once lost. Many devices, for example, are battery powered, and if the batteries fail the programming may be lost.

It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. A system for providing timing information to a microprocessor-controlled device having a set of mechanical functions that are started and stopped by a time-of-day (TOD), comprising:

a device including an integrated microprocessor for controlling the mechanical functions of the device;

an interactive interface presented on a display of a computer appliance, separate from the device, having a Universal Serial Bus (USB) port, enabling a user to select through the interactive display individual ones of the set of mechanical functions for the microprocessor-controlled device, and to select specific TOD for starting or stopping the mechanical functions selected; and a thumb drive flash memory unit including a USB connector;

wherein the computer appliance saves the TOD selected for each mechanical function selected, in a form compatible with and executable by the microprocessor of the device, to the thumb drive through the USB port, the thumb drive to be carried to the microprocessor-controlled device and engaged to a USB port at the device, to upload the timing information to the microprocessor of the device, the microprocessor altering programmed mechanical functions of the device by executing the uploaded timing information for the mechanical functions of the device.

2. The system of claim 1 wherein the device is a timing device for a sprinkler system, and the mechanical functions are opening and closing of switches for controlling water valves.

3. A method for providing timing information to a microprocessor-controlled device including an integrated microprocessor for controlling a set of mechanical functions of the device that are started and stopped by a time-of-day (TOD), comprising the steps of:

selecting through an interactive display presented by a computer program specific to the microprocessor-controlled device on a monitor screen of a computer appliance separate from the device, individual ones of the set of mechanical functions of the microprocessor-controlled device;

selecting for the individual mechanical functions specific TOD for starting and stopping the mechanical functions;

saving the TOD for each selected mechanical function in a form compatible with and recognizable by the microprocessor of the device, to a thumb drive flash memory unit including a USB connector through a USB port of the computer appliance, to be carried to the microprocessor-controlled device and engaged to a USB port at the device, to upload to the microprocessor of the device the timing information; and altering programmed mechanical functions of the device by executing the uploaded timing information from the microprocessor of the device, thereby controlling the mechanical functions of the device according to the uploaded timing information.

4. The method of claim 3 wherein the device is a timing device for a sprinkler system, and the mechanical functions are opening and closing of switches for controlling water valves.

\* \* \* \* \*